(12) United States Patent
Maurer

(10) Patent No.: US 7,116,446 B2
(45) Date of Patent: Oct. 3, 2006

(54) RESTORATION AND ENHANCEMENT OF SCANNED DOCUMENT IMAGES

(75) Inventor: Ron P. Maurer, Haifa (IS)

(73) Assignee: Hewlett-Packard Development Company, L.P., Houston, TX (US)

( * ) Notice: Subject to any disclaimer, the term of this patent is extended or adjusted under 35 U.S.C. 154(b) by 517 days.

(21) Appl. No.: 10/377,197

(22) Filed: Feb. 28, 2003

(65) Prior Publication Data

US 2004/0169890 A1 Sep. 2, 2004

(51) Int. Cl.
*H04N 1/405* (2006.01)
*H04N 1/409* (2006.01)
*G06T 5/00* (2006.01)
*H04N 1/56* (2006.01)

(52) U.S. Cl. .......... 358/3.08; 358/3.26; 358/3.27; 358/532; 382/261; 382/264; 382/266

(58) Field of Classification Search .......... 358/1.9, 358/3.06, 3.08, 3.21, 3.26–3.27, 463, 534, 358/532; 382/254, 260, 261, 264, 275, 205, 382/266

See application file for complete search history.

(56) References Cited

U.S. PATENT DOCUMENTS

| | | | | |
|---|---|---|---|---|
| 4,642,683 A | * | 2/1987 | Alkofer | 358/522 |
| 5,166,810 A | | 11/1992 | Sorimachi | |
| 5,239,390 A | * | 8/1993 | Tai | 358/3.26 |
| 5,506,699 A | * | 4/1996 | Wong | 358/3.08 |
| 5,513,016 A | | 4/1996 | Inoue | |
| 6,072,907 A | * | 6/2000 | Taylor et al. | 358/1.9 |
| 6,101,285 A | | 8/2000 | Fan | |
| 6,167,163 A | * | 12/2000 | Fukushima | 382/260 |
| 6,195,456 B1 | * | 2/2001 | Balasubramanian et al. | 382/167 |
| 6,222,641 B1 | * | 4/2001 | Karidi | 358/1.9 |
| 6,590,676 B1 | * | 7/2003 | Karidi | 358/1.9 |
| 6,650,773 B1 | | 11/2003 | Maurer | |
| 6,731,821 B1 | | 5/2004 | Maurer | |
| 6,915,024 B1 | * | 7/2005 | Maurer | 382/274 |
| 2002/0154339 A1 | | 10/2002 | Kuo et al. | |
| 2004/0169872 A1 | * | 9/2004 | Maurer | 358/1.9 |
| 2004/0169891 A1 | * | 9/2004 | Maurer | 358/3.26 |

FOREIGN PATENT DOCUMENTS

EP 0622949 11/1994

OTHER PUBLICATIONS

Zimmerman et al. "An Evaluation of the Effectiveness of Adaptive Histogram Equalization for Contrast Enhancement", IEEE Transactions on Medical Imaging, vol. 7, No. 4, Dec. 1988, pp. 304-312.*
Zimmerman et al. "An Evaluation of the Effectiveness of Adaptive Histogram Equalization for Contrast Enhancement", Dec. 1988, IEEE Transactions on Medical Imaging, vol. 7, No. 4, pp. 304-312.*
Ron P. Maurer: "Reduction of Chromatic Bleeding Artifacts in Imges Containing subsampled Cromoinance Value" U.S. App. No. 09/676,866, filed Sep. 29, 2000.
Ron P. Maurer: "Image Sarpening by Variable Contrast Mapping" U.S. App No. 09/676,011, filed Aug. 7, 2000.

* cited by examiner

*Primary Examiner*—Scott A. Rogers

(57) ABSTRACT

Processing of a pixel in a digital image includes performing inverse halftoning on the pixel with respect to a local pixel neighborhood; and performing selective sharpening on the inverse halftoned pixel with respect to the local pixel neighborhood.

19 Claims, 2 Drawing Sheets

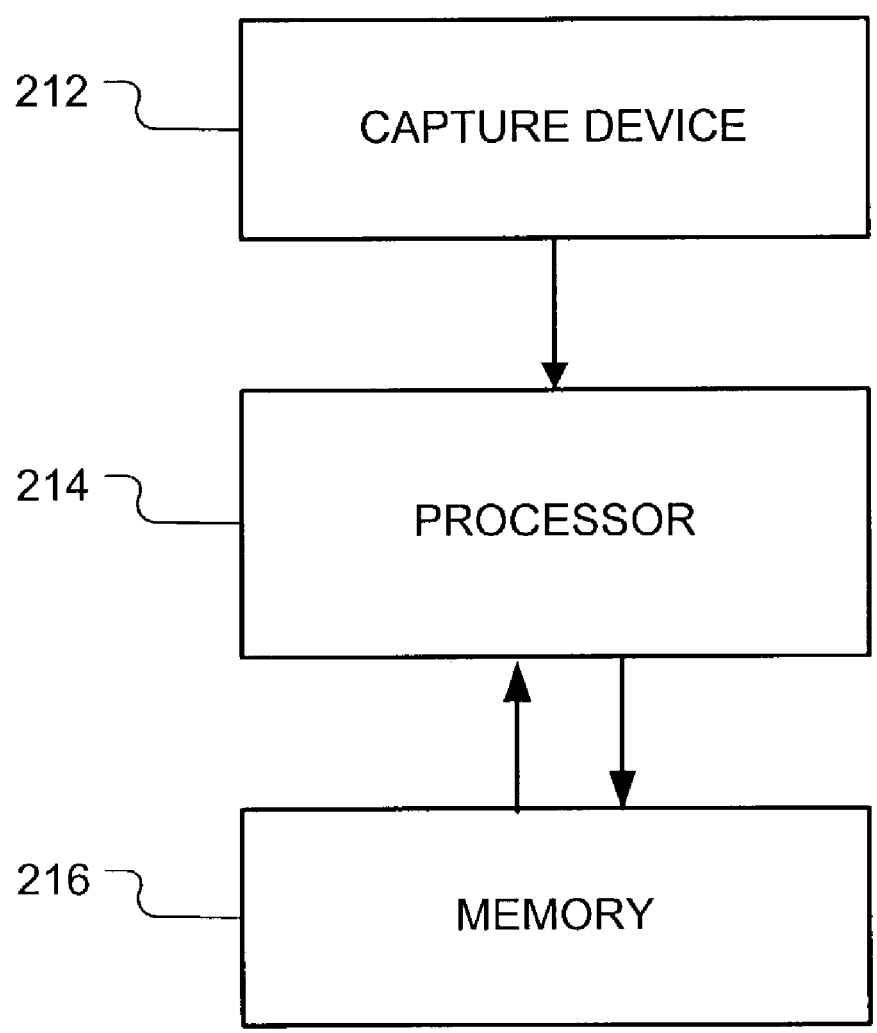

RESTORATION AND ENHANCEMENT OF SCANNED DOCUMENT IMAGES

BACKGROUND

Document processing systems are capable of scanning documents and processing the resulting digital images. The processing might include image display (e.g., printing), compression, page segmentation and recognition, and optical character recognition (OCR). Compression reduces the size of the digital images, which reduces the cost of storing and transmitting the digital images. Page segmentation and recognition may be performed to separate natural features (e.g., photos) from text and other graphical features in compound documents. OCR may then be performed on text.

Scanned document images can be distorted with respect to the original documents. Scanning distortion can be caused by scanner smoothing and integration, electronic noise, and inaccurate measurement of white level. These scanning distortions can blur edges, and create noise and artifacts in digital images. Perceptible noise and artifacts can degrade image quality. Perceptible and imperceptible noise and artifacts can reduce compressibility. Reducing compressibility can increase the cost of storing and transmitting the images. The noise and artifacts can also increase the error rate of processing routines such as OCR.

The way in which the documents were created can also lead to distortions in the scanned image. For example, a printed document might contain halftone regions. Distortions such as Moire patterns can arise from interaction between halftone patterns and a scanner. The Moiré patterns and other halftoning noise artifacts can also degrade image quality and reduce compressibility.

Bleed-through artifacts can occur if a document is printed on both sides. When one side of a double-sided document is scanned, features on the opposite side of the document can be captured. These features appear as artifacts in the scanned digital image, manifested as phantoms of text characters and other dark features from the other side. The bleed-through artifacts can also degrade image quality and reduce compressibility.

SUMMARY

According to one aspect of the present invention, processing of a pixel in a digital image includes performing inverse halftoning on the pixel with respect to a local pixel neighborhood; and performing selective sharpening on the inverse halftoned pixel with respect to the local pixel neighborhood. Other aspects and advantages of the present invention will become apparent from the following detailed description, taken in conjunction with the accompanying drawings, illustrating by way of example the principles of the present invention.

BRIEF DESCRIPTION OF THE DRAWINGS

FIG. 2 is an illustration of a document processing system in accordance with an embodiment of the present invention.

DETAILED DESCRIPTION

Figure 1:
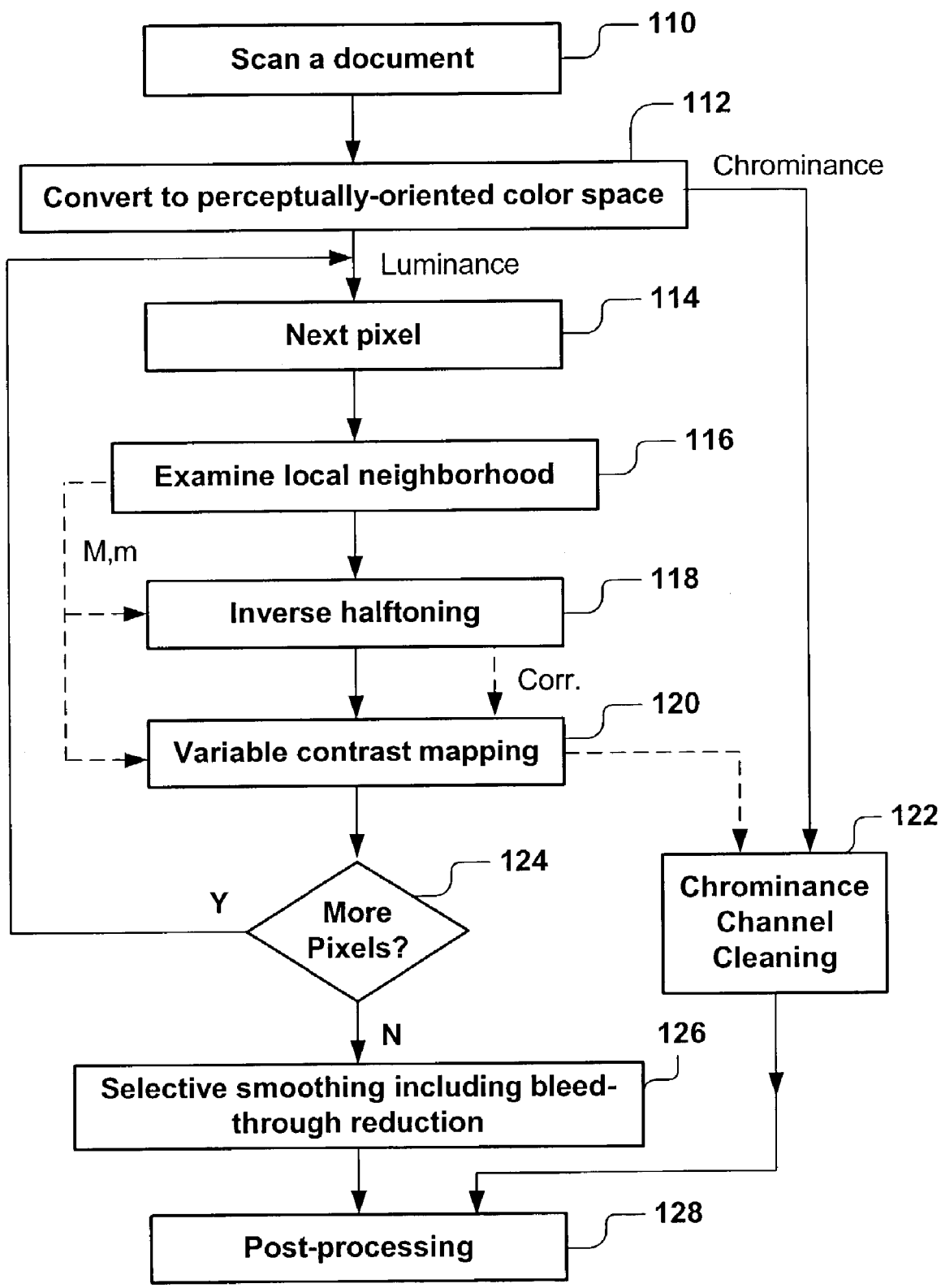
FIG. 1 is an illustration of a document processing method in accordance with an embodiment of the present invention.

Reference is made to FIG. 1, which illustrates a method of processing an original document. The document may include only graphical features (e.g., text, CAD objects), or the document may include only natural features (e.g., photographs), or the document may be a compound document, which includes both graphical and natural features. The exemplary method that follows is applied to a color compound document that includes halftone regions.

The document is scanned to produce a digital image. (110). Each pixel value of the scanned image typically has red, green and blue (RGB) color components. The scanned image might contain distortions such as halftoning noise, bleed-through artifacts, electronic noise, and blur.

Each pixel is converted to a perceptually-oriented color space (112). Examples of such color space include $YC_bC_r$ and Lab.

The scanned image is processed one pixel at a time (114). The pixel being processed will be referred to as the pixel of interest.

A local neighborhood of the pixel of interest is examined (116). For example, minimum and maximum intensities for the local neighborhood are determined, and a local contrast is determined as the difference between the minimum and maximum intensities. The local neighborhood may contain the pixel of interest. The local neighborhood may be relatively small, such as a 3×3 pixel neighborhood.

Inverse halftoning is performed on the luminance component of the pixel of interest with respect to the local neighborhood (118). The inverse halftoning converts pixel intensities in halftoned regions to smoother, more continuous values. The inverse halftoning also selectively smoothes non-halftone regions. A conventional linear low pass filter that uses local pixel information may be used. For example, the filter may be an isotropic filter with a 2D-Gaussian like kernel, i.e. kernel-weights are gradually decreasing as a function of distance from the kernel-center. In the alternative, blind inverse halftoning may be performed according to assignee's U.S. Ser. No. 10/376,911 filed concurrently herewith and incorporated herein by reference.

Variable contrast stretching is performed on the luminance value resulting from the inverse halftoning. Each pixel is processed with respect to the contrast of a local neighborhood. However, the variable contrast stretching does not use local neighborhood information generated by the inverse halftoning because the inverse halftoning tends to reduce contrast of narrow features (e.g., lines and characters). Instead, the variable contrast stretching uses the local neighborhood information at step 116. Thus, the inverse halftoning and the local contrast stretching are performed in a single pass with respect to the same local neighborhood information.

Variable contrast stretching is disclosed in assignee's U.S. Ser. No. 09/676,011 filed Sep. 29, 2000. Assignee's U.S. Ser. No. 10/377,523 filed concurrently herewith discloses a variable contrast mapping method that includes variable stretching in high contrast regions, identity mapping in medium contrast regions, and compact compaction in low contrast regions. Both U.S. Ser. No. 09/676,011 and U.S. Ser. No. 10/377,523 are incorporated herein by reference.

During variable contrast sharpening, certain statistics may be generated with minimal overhead from the minimum and maximum values of the local neighborhoods. These statistics, such as edge-related statistics of pixel intensities on dark and light sides of edges, can be stored for later use (e.g., estimation of background luminance level for background bleaching).

Chrominance channel cleaning may be performed in a conventional manner (122). Low-pass filtering may be applied to each of the chrominance channels for reducing noise and halftones. For pixels detected as luminance edges (the detection having been performed during variable contrast mapping), weak chrominance information can be removed (zeroed) to avoid visible color fringes.

The inverse halftoning and variable contrast sharpening may be performed during a first pass.

Bleed-through reduction may be performed during a second pass (126). A second pass is preferred because the performance of the bleed-through reduction algorithm can be greatly improved by first removing halftone noise. The second pass is also preferred if a different type or size neighborhood is used during the inverse halftoning and variable contrast stretching than during bleed-through algorithms For example, a punctured 3×3 local neighborhood might be used during inverse halftoning and variable contrast stretching, while a full (non-punctured) 7×7 window might be used during bleed-through reduction.

A conventional bleed-through reduction method may be used. Instead, the visibility of bleed-through artifacts may be greatly reduced by a selective smoothing method disclosed in assignee's U.S. Ser. No. 10/376,888 filed concurrently herewith and incorporated herein by reference. In addition to reducing the visibility of bleed-through artifacts, the selective smoothing can further smooth halftone noise in inverse halftoned regions such as background patches and foreground interiors.

Post-processing may be performed on the filtered digital image (128). The post-processing may include printing or displaying the scanned images. Other types of post-processing include, without limitation, display enhancement, compression, page segmentation and recognition, OCR, and global tone mapping. Compression rates of bit-plane compression can be improved substantially, since noise is reduced in the higher bit planes. Noise reduction can also improve compression in a method such as mixed raster content (MRC). MRC generates a background image, a foreground image, and a binary toggling mask. Cleaner separation of the background and foreground features results in greater compressibility of the binary toggling mask. The cleaner separation of background and foreground features can also improve the performance of OCR and other document-understanding algorithms. Cleaner images result in more accurate background bleaching.

The present invention is not limited to the method just described. Inverse halftoning and variable contrast stretching may be performed on chrominance information. Bleed-through reduction can also be performed on the chrominance information.

The method is not limited to variable contrast stretching. The edges may be selectively sharpened by another method.

The method is not limited to any particular inverse halftoning, sharpening, or bleed-through reduction technique. However, a synergy can be realized from the use of the assignee's blind inverse halftoning, variable contrast mapping and selective smoothing. Specifically, these techniques perform complementary functions by compensating for image distortions that weren't corrected in the previous precessing. For small local neighborhoods, blind inverse halftoning does not fully preserve edges and does not totally smooth halftone regions. However, the contrast stretching sharpens the blurred edges, and the contrast compaction performs further smoothing in halftone regions and other low contrast regions. The combined effect of the blind inverse halftoning and the variable contrast mapping enhances the edges. Moreover, if the blind inverse halftoning cannot bring a pixel into the range of its neighbors, it will be brought into this range via variable contrast mapping. In addition, the inverse halftoning reduces contrast of the bleed-through, which improves performance of the selective smoothing.

In addition to reducing bleed-through, the selective smoothing performs smoothing of halftone noise and other noise in background patches and foreground interiors. Although the selective smoothing can cause some blurring of edges, the variable contrast mapping can compensate for this eventual blurring by slightly oversharpening the edges in advance.

Moreover, a digital image may be processed only once prior to compression, since the variable contrast mapping avoids overshoot. Thus the need to perform sharpening each time after decompression is avoided.

During blind inverse halftoning a correction term is computed and mapped by a robust influence function. The correction term indicates the degree of modification to the intensity of the pixel of interest. In a region with low to medium contrast, a large correction term does not suggest an edge. Rather it suggests that the pixel of interest is in a halftone region. The variable contrast mapping can make use of this information. For example, this information could be used to reduce the contrast stretching parameter ($\lambda$) to increase the smoothing of the halftone regions.

The combination of assignee's blind inverse halftoning, variable contrast mapping and selective smoothing can yield excellent results, yet can be performed with low computational complexity. The neighborhood can be kept to a small (e.g., 3×3) size. In a hardware or software implementation, the processing can be performed using only integer arithmetic and precomputed lookup table terms. Thus the processing can be implemented in a very efficient manner in real time.

Although the exemplary method above uses two passes, the method according to the present invention is not so limited. As a first example, each of the blind inverse halftoning, variable contrast mapping, and selective smoothing may be performed in a separate pass. As a second example, the inverse halftoning can be performed in a first pass, and variable contrast mapping and selective smoothing can be combined in a second pass.

FIG. 2 shows a digital imaging system 210. An image capture device 212 scans a document and provides lines of a digital image to a processor 214. The processor 214 may store all of the lines of the digital image in memory 216 for processing later, or it may process the scanned image in real time. The output image may be stored in the memory 216. The processor 214 may use hardware, software or a combination of the two to process the digital image according to the method of FIG. 1. The processor may perform additional processing as well.

In a software implementation, the memory 216 stores a program that, when executed, instructs the processor 214 to perform the method of FIG. 1. The processor 214 and memory 216 may be part of a personal computer or workstation, they may be embedded in an image capture device 212, etc.

The scanning, processing, and post-processing may be distributed among two or more machines. For example, a scanner can generate a digital image and send that digital image to a personal computer. The personal computer can then filter the image and perform post-processing on the filtered image.

The present invention is not limited to the specific embodiments described and illustrated above. Instead, the invention is construed according to the claims that follow.

The invention claimed is:

1. A method of processing a pixel of a digital image, the method comprising:
   performing inverse halftoning on the pixel with respect to a local pixel neighborhood; and
   performing selective sharpening on the inverse halftoned pixel with respect to the local pixel neighborhood.

2. The method of claim 1, wherein the digital image is a scanned image.

3. The method of claim 1, wherein variable contrast stretching is used for selective sharpening.

4. The method of claim 3, wherein the contrast stretching compensates for blurred edges resulting from the inverse halftoning.

5. The method of claim 1, wherein the selective sharpening is performed if the pixel is in a high contrast neighborhood, the method further comprising performing contrast compaction if the pixel is in a low contrast neighborhood.

6. The method of claim 5, wherein the contrast compaction performs additional smoothing of inverse-halftoned regions.

7. The method of claim 1, wherein the inverse halftoning and selective sharpening are performed on a luminance component of the pixel.

8. The method of claim 7, further comprising performing bleed-through reduction on the luminance component, the inverse halftoning and sharpening performed during a first pass, the bleed-through reduction performed during a second pass.

9. The method of claim 8, further comprising smoothing background patches and patches of foreground interiors during the second pass.

10. The method of claim 1, wherein the inverse-halftoning and sharpening generate statistics about pixels at edges in the digital image; the method further comprising accumulating the statistics.

11. The method of claim 1, further comprising processing a plurality of other pixels in the digital image by the inverse halftoning and the sharpening; and post-processing of the processed pixels.

12. A method of processing a plurality of pixels of a digital image, the method comprising:
   determining local contrast information for the pixel; and
   performing inverse halftoning and variable contrast stretching on the pixel using the same local contrast information.

13. A method of processing a pixel of a digital image, the method comprising:
   performing inverse halftoning on the pixel;
   performing variable contrast mapping on the inverse halftoned pixel; and
   performing selective smoothing on the mapped pixel;
   the inverse halftoning, contrast mapping and selective smoothing performing complementary functions.

14. The method of claim 13, wherein the complementary functions include edge enhancement.

15. The method of claim 13, wherein the complementary functions include smoothing of halftone noise.

16. The method of claim 13, wherein the complementary functions include reduction of bleed-through.

17. A system comprising:
   means for generating a scanned digital image, the scanned image including a plurality of pixel values;
   means for performing inverse halftoning on each pixel value of the plurality with respect to a local pixel neighborhood; and
   means for performing selective sharpening of the inverse halftoned pixel values by mapping the inverse halftone pixel values with respect to the same local pixel neighborhoods used during the inverse halftoning.

18. Apparatus for processing a pixel of a digital image, the apparatus comprising a processor for performing inverse halftoning on the pixel with respect to a local pixel neighborhood; and performing selective sharpening on the inverse halftoned pixel with respect to the local pixel neighborhood.

19. An article for instructing a processor to process a plurality of pixels of a digital image, the article comprising computer memory encoded with a program for instructing the processor to perform inverse halftoning on each pixel value of the plurality with respect to a local pixel neighborhood, and perform selective sharpening of the inverse halftoned pixel values by mapping the inverse halftone pixel values with respect to their local pixel neighborhoods.

* * * * *